United States Patent
Machiraju et al.

(10) Patent No.: US 7,912,955 B1
(45) Date of Patent: Mar. 22, 2011

(54) MODEL-BASED PROVISIONING OF RESOURCES

(75) Inventors: Vijay Machiraju, Hyderabad (IN); James C. Pruyne, Naperville, IL (US); Akhil Sahai, Santa Clara, CA (US); Subramoniam N. Iyer, Newark, CA (US); Keith Farkas, San Carlos, CA (US); Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 964 days.

(21) Appl. No.: 11/789,409

(22) Filed: Apr. 24, 2007

(51) Int. Cl.
*G06F 15/177* (2006.01)
*G06F 15/173* (2006.01)

(52) U.S. Cl. ...................... 709/226; 709/221

(58) Field of Classification Search .................. 709/226, 709/221, 220
See application file for complete search history.

(56) References Cited

U.S. PATENT DOCUMENTS

| | | | | |
|---|---|---|---|---|
| 6,915,347 | B2 * | 7/2005 | Hanko et al. | 709/227 |
| 7,310,673 | B2 * | 12/2007 | Zhu et al. | 709/226 |
| 7,313,101 | B2 * | 12/2007 | Rhine et al. | 370/254 |
| 7,644,162 | B1 * | 1/2010 | Zhu et al. | 709/226 |
| 7,676,578 | B1 * | 3/2010 | Zhu et al. | 709/226 |
| 7,827,557 | B2 * | 11/2010 | Zhu et al. | 718/104 |
| 2002/0019860 | A1 * | 2/2002 | Lee et al. | 709/220 |
| 2007/0260723 | A1 * | 11/2007 | Cohen et al. | 709/223 |

OTHER PUBLICATIONS

Sahai, A. et al., "Automated Generation of Resource Configurations Through Policies"; 2004.
Singhal, S. et al., "Quartermaster-A Resource Utility System", IEEE/IFIP International Conf. on Integrated Management, May 2005.
Zhu, X. et a., "Optimal Resource Assignment in Internet Data Centers", IEEE, Aug. 2001.
DMTF Common Information Model Standards, http://www.dmtf.org/ standards/cim, downloaded Apr. 10, 2007.
Dunes Technologies, http://www.dunes.ch, downloaded Apr. 10, 2007.
Enigmatec, Execution Management System (EMS), http://www.enigmatec.net/Products/product/Execution_Management_System_(EMS), downloaded Apr. 10, 2007.
GoToMyPC, https://www.gotomypc.com/en_US/howItWorks.tmpl?, downloaded Apr. 19, 2007.
HP Consolidated Client Infrastructure, http://h71028.www7.hp.com/enterprise/cache/279997-0-0-225-121.aspx, downloaded Apr. 19, 2007.
HP ProLiant Essentials Virtualization Management Software, http://h18026.www1.hp.com/products/servers/management/rdp/index.html, downloaded Apr. 10, 2007.
HP ProLiant Essentials Rapid Deployment Pack, http://h18004.www1.hp.com/products/servers/management/rdp.html, downloaded Apr. 10, 2007.
IBM Autonomic Computing, http://www-03.ibm.com/autonomic, downloaded Apr. 19, 2007.

(Continued)

*Primary Examiner* — Larry Donaghue

(57) ABSTRACT

Resources are provisioned for shared services in a resource-on-demand system. A model representing an observed state of resources in the resource-on-demand system allocated to the shared services and a model representing a desired state of the shared services are stored. At least one policy applicable to provisioning the resources for the shared services is determined. The policy and information from the models are applied to automatically provision the resources for satisfying the desired state of the shared services.

18 Claims, 9 Drawing Sheets

OTHER PUBLICATIONS

Microsoft System Center Virtual Machine Manager Product Overview, http://www.microsoft.com/systemcenter/scvmm/evaluation/overview/default.mspx, downloaded Apr. 10, 2007.
Microsoft Introducing System Center, http://www.microsoft.com/systemcenter/default.aspx, downloaded Apr. 19, 2007.
Moka 5, http://www.moka5.com, downloaded Apr. 19, 2007.
Open Grid Forum, http://www.ogf.org/, downloaded Apr. 19, 2007.
Symantec pcAnywhere, http://www.symantec.com/smb/products/overview.jsp?pcid=cli_mgmt&pvid=pca12, downloaded Apr. 19, 2007.
VMwware Desktop Infrastructure, http://www.vmware.com/solutions/desktop/vdi.html, downloaded Apr. 10, 2007.
VMwware Virtual Center, http://www.vmware.com/products/vi/vc/, downloaded Apr. 10, 2007.

* cited by examiner

600

```
instance of AllocatorDescriptor
{
ConsumerClass = "VirtualMachine";     ~— 601
ResourceClass = "Server";     ~— 602

ConsumerFilter = "isHosted == false";    ~— 603
ResourceFilter = "isVMHost == true";     ~— 604

Constraint Expr =     ~— 605
"resource.ProcessorType ==
 consumber.ProcessorType";

AssociationClass = "HostedOn";        ~— 608
ResourceAssocProp = "Antecedent";     ~— 609
ConsumerAssocProp = "Dependent";      ~— 610
};

instance of AttributeMap
{
ConsumerCapExpr = "MemorySize";         ~— 607
ResourceCapExpr = "MemorySize-512";     ~— 606
};
```

FIG. 6

MODEL-BASED PROVISIONING OF RESOURCES

RELATED APPLICATIONS

This application is related to U.S. patent application Ser. No. 11/789,411, entitled "Automated Model-Based Provisioning of Resources", by Graupner et al. and U.S. patent application Ser. No. 11/789,412, entitled "Automated Provisioning of Virtual Machines for a Virtual Machine Buffer Pool and Production Pool", by Sahai et al, both of which are filed concurrently with the present application and are incorporated by reference in their entireties.

BACKGROUND

Distributed computing services, utility-based data centers, and other types of resource-on-demand systems are becoming increasingly popular as a highly scalable means for utilizing computer resources to meet the computing demands of users.

Managing these resource-on-demand systems, including provisioning resources to satisfy user demand, is a difficult task that requires a significant amount of time and labor. Resource-on-demand systems typically pre-allocate and pre-install servers and storage resources for customer applications. In order to meet predetermined quality of service (QoS) requirements, however, servers are typically over-provisioned and under utilized.

Provisioning resources is an even more difficult task if the resources are being provisioned for shared services, where user demand may be less predictable. For example, a virtual desktop system is a type of shared services environment that provides remote desktop sessions for users. A remote desktop session includes a "desktop" with service elements hosted remotely from the user. The service elements may include processing, memory and storage as well as the software, including an operating system and applications, hosted remotely from the user. For example, the service elements may be located in a datacenter remote from the user or another environment where large amounts of computing resources can be physically maintained. The display and user input devices for interacting with the remote desktop are located with the user away from the computing resources, and the users and computing resources are connected using a network. For example, users may use thin clients to interact with their remote desktops. "Thin client" is a device that provides an interaction capability of a user with a desktop system. A thin client includes a small computer with peripherals such as monitor, keyboard, mouse and other interfaces. The thin client runs software that allows displaying and interacting with the actual desktop which runs remotely on a computer (or in a virtual machine on a computer) in a shared services environment. The desktop is connected to the thin client via a network connection through which the desktop's content is presented on the thin client's monitor, and through which a user's interactions are mediated back to the desktop such as mouse or keyboard interactions.

Furthermore, the resources in the resource pool that are operable to be provisioned may be heterogeneous. For example, there may be heterogeneity in the resources that are provisioned to run different desktops in a data center. Some desktops may be run on virtual machines while other more powerful desktops may require that stand alone servers be dedicated to them. Some desktops may run on low-end hardware while others may require high-end servers with powerful multimedia and graphics capabilities. Also, there is heterogeneity in how desktops are delivered to users. Some desktops may be delivered through remote display protocols such as RDP (Remote Display Protocol) or RGS (Remote Graphics System). These protocols differ in their ability to support graphics intensive applications and various remote devices. Other desktops may be delivered through application streaming capabilities.

To satisfy their user needs, enterprises should be able to support heterogeneous resources as well as heterogeneous user needs. However, currently, there is no common or uniform mechanism for managing and provisioning heterogeneous resources for different types of desktops. For example, each of the above-mentioned types of desktops would be deployed as independent products with their own management components. This results in high management costs. Furthermore, current provisioning systems lack the flexibility to quickly and easily deploy new desktop types, new servers or new virtualization types.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 6 illustrates an allocation description, according to an embodiment;

DETAILED DESCRIPTION

For simplicity and illustrative purposes, the principles of the embodiments are described. However, one of ordinary skill in the art would readily recognize that the same principles are equally applicable to, and can be implemented using variations of the described embodiments.

According to embodiments, a model-based provisioning system and methods are described for provisioning resources in a resource-on-demand system. The model-based provisioning system uses models to describe details of heterogeneous resources, desktops, and delivery mechanisms. In particular, the system being model-based refers to the fact that it operates on information that is represented in the system in the form of well-defined models. The provisioning system uses the information captured in the models to provision and manage the resources to satisfy user requests for resources, which may include a request for resources for a shared service, such as a virtual desktop service.

The drive to higher utilization of information technology (IT) resources and faster time to deliver services has lead to a computing environment supporting shared services. Shared services are multiple services sharing the same infrastructure, with resources dynamically provisioned among the services. According to an embodiment, a model-based provisioning system is operable to provisioning resources for shared services. Each service is represented in a model-based manner and defines a workflow including a sequence of actions performed, for example, by management tools in the provisioning system for provisioning resources for the services. The management tools perform provisioning actions, but the provisioning system is extensible to allow for additional tools to be integrated as needed.

The model-based provisioning system provides a mechanism for automated provisioning and management of desktops in a Virtual Desktop System (VDS) that run on a number of different platforms, such as bladed systems, virtual servers and other distributed systems, and that use a number of different connection protocols, such as RDP, RGS or a streaming application. Also, the system provides a single management console or management portal for managing desktops hosted in both virtualized and non-virtualized environments. Furthermore, the model-based provisioning simplifies the process of introducing new classes of desktops and allows easier management of user-desktop relationships. A wide variety of desktop classes can be introduced and managed, where each class of desktop may require a different set of applications.

The provisioning system according to embodiments described herein is generally described with respect to provisioning resources for a VDS. It will be apparent to one of ordinary skill in the art that the provisioning system is operable to provision resources for other types of shared services and for other types of user demands that may be described using the model-based approach described herein.

Figure 1:
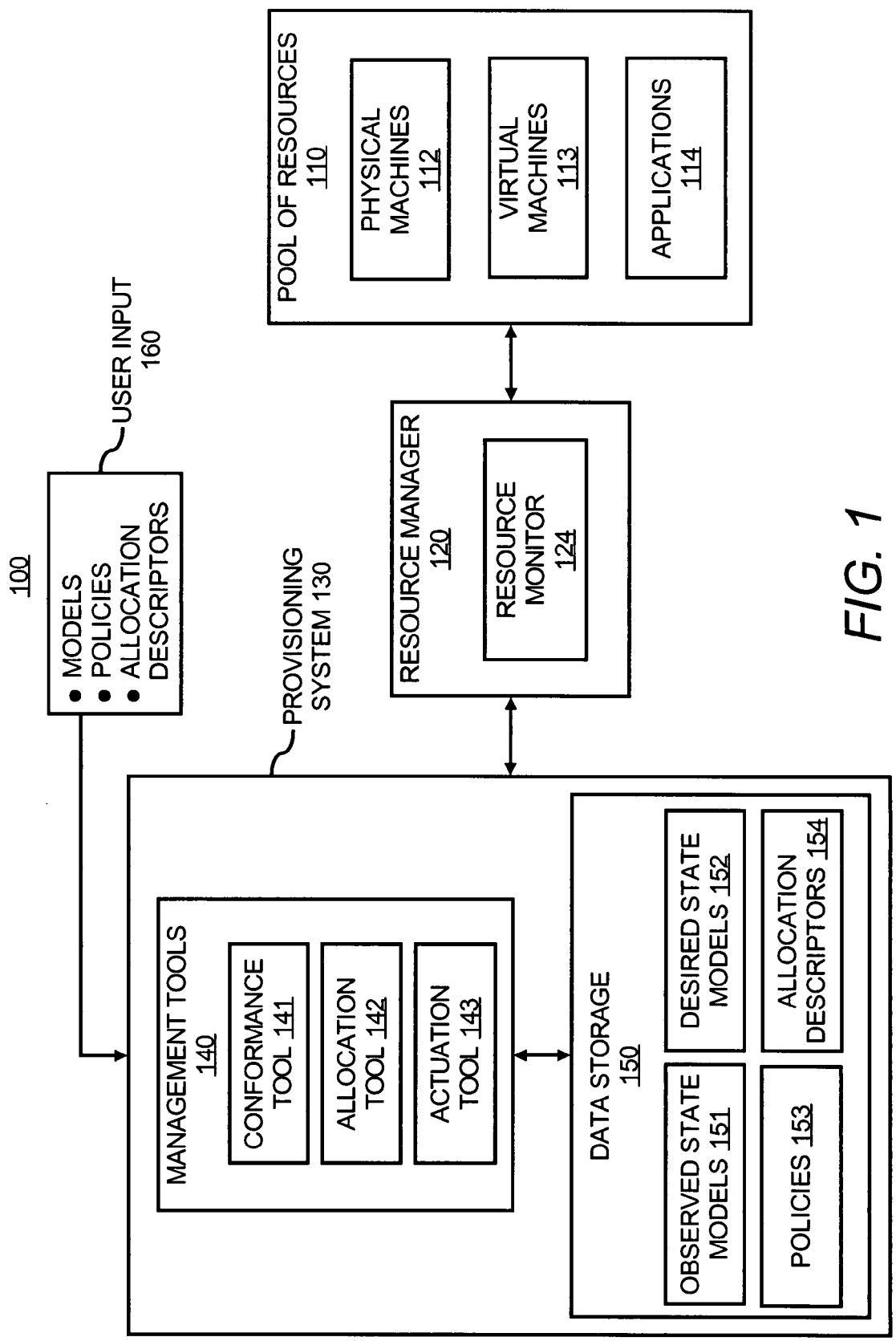
FIG. 1 illustrates a resource-on-demand system, according to an embodiment.

FIG. 1 illustrates a system 100 according to an embodiment for providing computer resources on demand. The system 100 includes a model-based provisioning system 130, a resource manager 120, and a pool of resources 110.

The pool of resources 110 includes resources allocated to user demand. The pool of resources 110 may include any type of resource available on servers or clusters of servers or racks of bladed servers that are to be shared by applications, such as processors, memory, disk storage, network slots, etc. The resources may be heterogeneous. For example, the pool of resources 110 may include different types of processors, and different resources may have varying capacities, such as different CPU speeds for different processors. The pool of resources 110 also includes software, such as operating systems and user applications. Heterogeneous resources may include different types of connection protocols, such as Remote Desktop Protocol (RDP), Remote Graphics System (RGS) or a streaming application, used to connect a user's computer or client device to remote resources provisioned for the user's computing demand.

As shown in FIG. 1, the pool of resources 110 includes physical machines 112, virtual machines 113 and applications 114. The physical machines 112 are machines provisioned for user demand. For example, a server may be a physical machine or processors, memory, etc, may be included in a physical machine. The virtual machines 113 are logical entities comprised of one or more physical machines or portions of the capacity of one or more physical machines. For example, a virtual machine may be comprised of a percentage of compute cycles for one or more processors, 1 GB memory and 10 GB memory size. Each virtual machine is characterized by its demand. Virtual desktop system demand is the demand created by remote desktop sessions of users. A virtual machine may be created for each remote desktop session or may be created for a group of remote desktop sessions. The virtual machine is sized to support the demand of the remote desktop sessions it is running. Known server partitioning technology may be used to create a virtual machine, such as VMWare, Virtual Server, Xen, etc.

Although shown as separate from the physical machines 112 and the virtual machines 113, the applications 114 including software running on a physical machine or a virtual machine. The applications 114 may include operating systems and user applications.

The system 100 also includes the model-based provisioning system 130. The provisioning system 130 includes management tools 140 and data storage 150. The management tools 140, for example, are software tools for provisioning resources in the pool of resources 110. The management tools 140 use models stored in the data storage 150, which represent shared services or other types of user requests for resources and provisioned resources, to allocate resources to accommodate user demand.

In one embodiment, the system 100 provisions resources for shared services, and the provisioning system 130 is responsible for managing and provisioning resources for the shared services. The shared services may be characterized by centralized operation of several instances of an IT service, whereby resources are shared between those instances. Examples of shared services include infrastructure shared services and application-level shared services. Infrastructure shared services, such as server or storage utilities, are the most basic shared services where physical or virtual infrastructure resources are dynamically provisioned to applications that need them. Application-level shared services include sets of applications or application containers configured and provisioned dynamically to run end-user applications and business processes. A VDS is shared services, described in more detail below, where different classes of "desktops" may be provisioned to accommodate different types of users.

The models stored in the data storage 150 may be used to support a variety of shared services easily and consistently, and allow for rapid customization to accommodate arbitrary services. The data storage 150 may include two model repositories storing observed state models 151 and desired state models 152. The observed state models 151 and desired state models 152 generally represent, respectively, the observed state of resources and the desired state of resources for user demand. For example, the observed state of resources may include the state of resources currently allocated to desktops in a VDS, and the desired state may include details regarding the optimum number of desktops to be created and supported at all times.

The management tools 140 incrementally determine what differences exist between the observed state models 151 and the desired state models 152, and make changes in the system 100 to accomplish the service provisioning. The content of the models, how the states are compared, and the management tools 140 are described in more detail below.

The models 151 and 152 allow new shared services to be easily introduced and existing shared services to be easily modified. By creating a proper model for shared services, the provisioning system 130 can automatically provision resources for the shared services without requiring any new, custom code development. The models 151 and 152 may include information models comprised of structured information, which in this case include information for managing systems and applications. The models may be structured so that humans or software can create, modify, use, and delete such information easily.

Information models may use a known schema, such as a meta-model. One example of a meta-model that may be used for the models 151 and 152 is the Common Information Model Schema (CIM Schema) from the Distributed Management Task Force (DMTF). The information model uses the CIM Schema as the meta-model for representing information models. If the CIM Schema is used to represent the information models, the management tools 140 support information models that are conformant to CIM Schema. If certain information is natively available in a model that does not conform to CIM Schema, then a tool may be used to convert it into a model that conforms to CIM Schema.

The provisioning system 130 may maintain two distinct model domains comprised of the desired state models 152 and the observed state models 151. Each of these domains may be modeled using CIM, and many of the model elements, such as class definitions, may be shared across the two domains. However, how instances of these models are populated and updated is completely different in the two domains. The desired state models 152 contain the descriptions of the service and the goals for provisioning the service. These descriptions and goals may be set by an operator and received in the user input 160. The desired state models 150 provide the input for various management tools which perform the provisioning process.

The observed state domain represents a current state of the shared services environment. This may include resources currently allocated to the shared service, utilization of the resources, and other information about resources currently provisioned for the service. The observed state models 151 are populated with these values representing a current state of the shared services environment. A resource monitor 124 in a resource manager 124 may determine which resources are allocated to the shared services and resource utilizations, and provide these values to the provisioning system 130 for populating an observed state model for the shared services. The desired state may be set by an operator or an entity external to the provisioning system 130. The observed state may be discovered and changed indirectly by making changes to the real environment, which includes the pool of resources 110. Together, the two domains comprised of the observed state models 151 and the desired state models 152 comprise the inputs to management tools 140.

Figure 2:
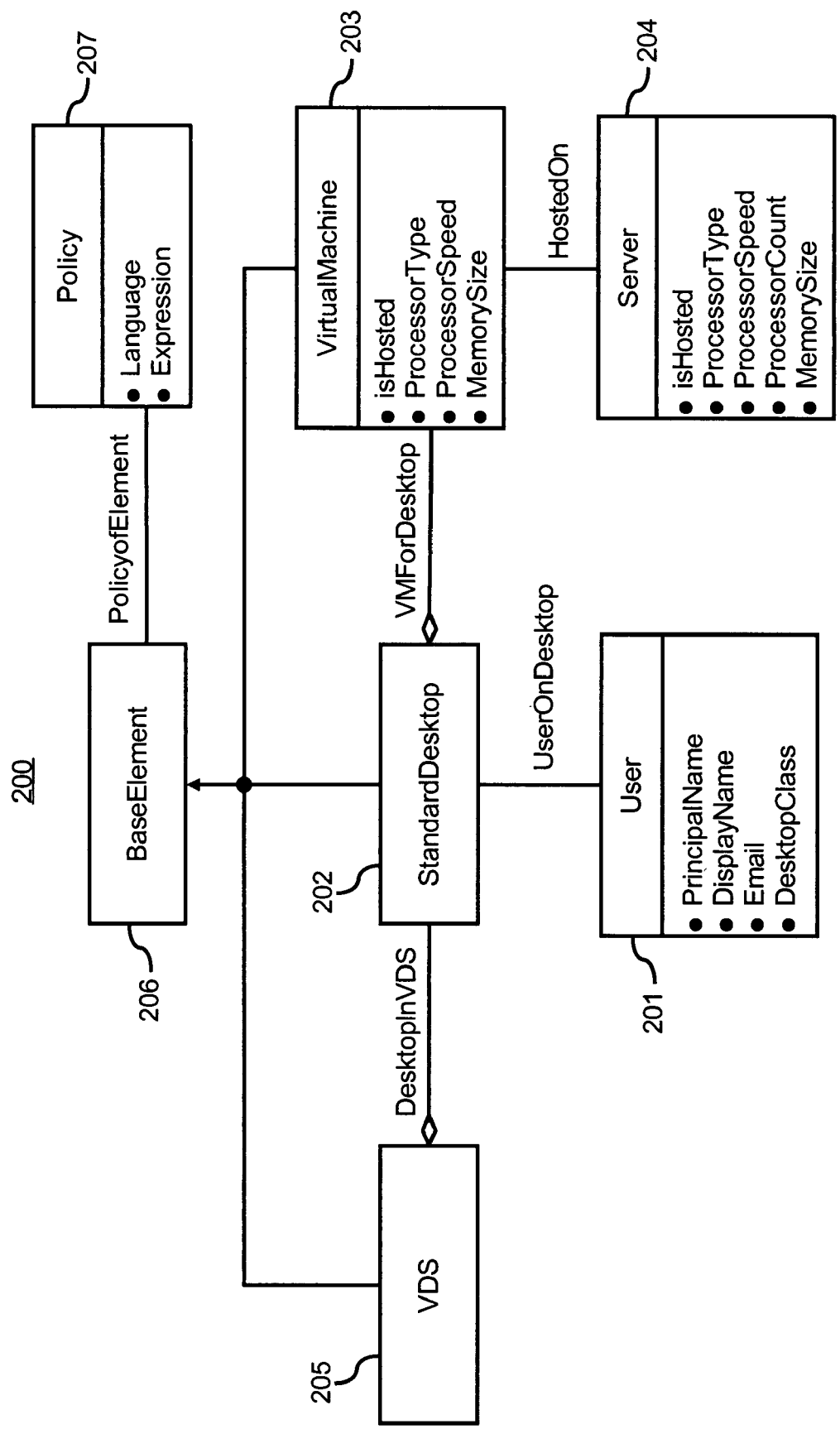
FIG. 2 illustrates classes in a desired state model, according to an embodiment.

Initial tasks that must be performed to automate provisioning for shared services are to define the models in the two domains. FIG. 2 shows a portion of a desired state model 200 for VDS. The desired state model 200 represents entities that are essential to support the information needs of the provisioning system 130 for provisioning resources to satisfy service requirements. Thus, the desired state model 200 for VDS includes structures for describing service elements, such as physical machines, virtual machines, desktop classes, etc.

For example, the desired state model 200 for the VDS may specify descriptions of the servers and virtual machines desired for desktops. To keep track of the number and types of desktops currently in use, the provisioning system 130 requires information pertaining to users that are currently logged into the system. All of these elements may also be represented in the desired state model 200 for VDS. The exact structure of the model is dependent on the service and on the needs of the tools that make up the provisioning system.

In the example shown in FIG. 2, the desired state model 200 defines five classes: a user class 201 which represents a type of user who may make use of desktops; a Standard Desktop class 202 which corresponds to a class of desktops being provided as part of VDS; a VirtualMachine class 203 which represents a virtual machine that is running to support one or more desktops, a Server class 204 which represents a physical server that may host a virtual machine or provide compute facilities to other services; and a VDS class 205. The VDS class 205 defines an aggregation of all the desktops running on resources from the pool of resources 110, and represents a container element for all other entities that are part of the VDS deployment. All of the classes 201-205 inherit characteristics from a common Base Element 206 to which an instance of a Policy class 207 can be attached.

Note that the desired state model 200 provides at least part of a workflow and system requirements. The workflow includes a sequence of actions to be performed to provision resources for the shared services, which is VDS in this example. The actions in the workflow may be performed by the management tools 140 as described in detail below. The workflow in the desired state model 200 includes allocating a server with the specified server attributes, and deploying a virtual machine on the server to run desktops in the Standard-Desktop class 202.

A corresponding observed state model for the desired state model 200 may include all the service elements needed to provide the service. For example, the observed state model may include an inventory including a number of servers allocated and unallocated, virtual machines allocated to the shared services, number of desktops deployed for each class, etc. The number of allocated service elements and attributes for the service elements may be values provided in the observed state model. This information is used to determine whether the observed state conforms to the desired state for the shared service. For example, based on the observed state, the management tools 140 may determine whether the number of desktops deployed satisfies the desired state or whether the number and type of servers allocated to the shared services satisfies the desired state.

Model schemas for the desired state model 200 and a corresponding observed state model may be created by an administrator and stored in the data storage 150. Then, an operator/user or the system may populate the models. For example, the desired state model may be populated by an operator and the observed state model may be populated with values that are observed or measured. The observed state model may be populated using information provided by monitoring and management tools that are deployed in the managed environment. For example, the resource manager 120, including the resource monitor 124, shown in FIG. 1, may monitor resources and determine values to populate the desired state model 200.

Each management and monitoring tool may be responsible for generating instances of one or more of the model classes and relationships. These instances may then be combined by another tool for use by the provisioning system 130. For example, instances of the Server class 204 may be obtained from a network discovery tool, while instances of the Virtual-Machine class 203 may be obtained from a virtualization management layer. For example, for the VirtualMachine class 203, the ProcessorType, ProcessorSpeed, and MemorySize are AMD, 2 GHz, and 2 GB because these are the attributes of the resources running the virtual machine, which may be determined by the resource monitor 124.

The desired state model 200 is a hierarchal model. For example, the bottom of the hierarchy is the Server class 204. The VirtualMachine class 203 is the next level of the hierarchy and the desktop classes 201, 202 and 205 are in the next highest level.

Policies are applied to a specified level of a hierarchy in the desired state model. For example, an instance of the Policy class 207 associated with the StandardDesktop class 202 is applied to that level of the hierarchy. However, the provisioning system may modify or allocate resources for lower levels of the hierarchy to satisfy the policy. For example, if a policy requires a minimum number of StandardDesktops be deployed at all times, then more virtual machines may be created to support more StandardDesktops if the number deployed falls below the specified minimum. Policies may be provided by a user, for example, in the user input 160. Policies are constraints on provisioning resources. Policies may be specified in desired state models or separately. For example, a constraint may be specified in an allocation description or may be specified separately. Policies may be stored in the data storage 150. For example, FIG. 1 shows policies 153 stored in the data storage 150.

Figure 3:
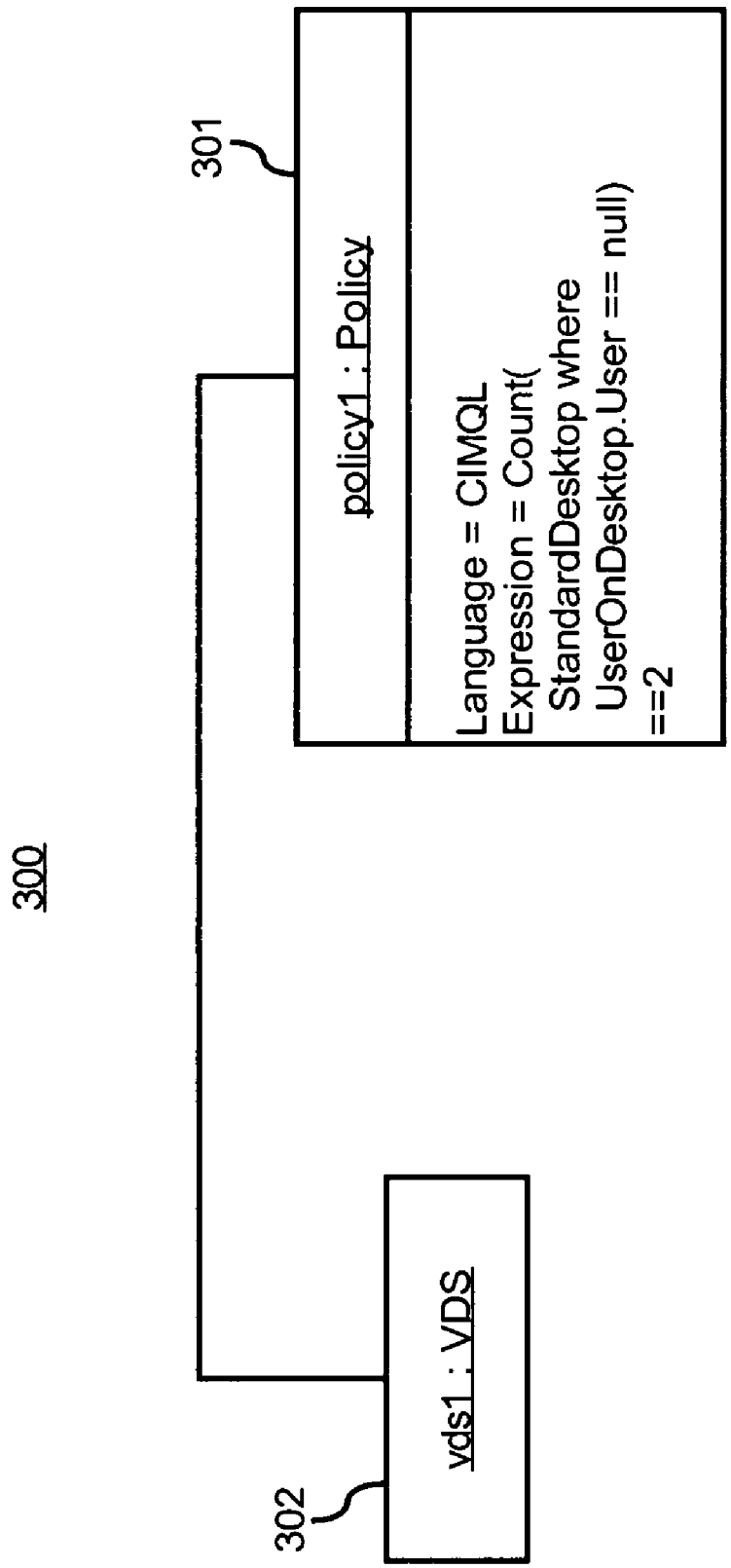
FIG. 3 illustrates an instance of a policy in a desired state model, according to an embodiment.

FIG. 3 shows a desired state model 300 for the VDS with an instance of the Policy class 207 shown in FIG. 2. The desired state model 300 may be provided by a user, for example, in the user input 160 shown in FIG. 1. The model 300 is populated with values also provided by the user and stored in the data storage 150 as one of the desired state models 152. The model 300 includes a policy object 301 that applies to the VDS class 205 in the desired state model 200 for the VDS.

The policy object 301 is instantiated to describe the desired state of the overall shared services which is represented by the instance vds 1 of the VDS class 205. The policy shown in this example states that the operator desires to maintain two idle standard desktops at all times in the VDS. Note that the policy assertion is in terms of the desktops which are service-level entities, and no concern is needed for the lower level portions of the model such as servers or virtual machines. Expanding this higher-level information into actionable desired state is one of the tasks performed by the management tools 140 of the provisioning system 130. This means that an operator can specify policy using familiar entities, and leave it to the provisioning system 130 to determine how these service entities are mapped to the lower levels.

The desired state model 300 is an example of what an operator might specify for a VDS service. For a different shared service, the definition of a desired state model could be very different. For example, the structure of the service as well as how desired service level policies are expressed could be different. Also, the policy may be defined using an entirely different syntax of the provisioning system supporting it.

Referring again to FIG. 1, the provisioning system 130 includes management tools 140. Each tool is presented with a uniform view of both the desired state and observed state of the service through the models. Because the representation is consistent, each tool is able to examine the portion of the model it is responsible for, and determine where the observed state is inconsistent with the desired state. A tool then takes actions to try to make the two states consistent. For example, if the service requirements as specified in the desire state model are not satisfied, changes to the desired state and/or actions on the real environment, which then get reflected in the observed state, are performed. The management tools 140 may be coordinated using a workflow, which is a predetermined sequence for invoking each tool to perform the automated provisioning of resources.

Some examples of the management tools 140 are also shown in FIG. 1. The management tools 140 may include a conformance tool 141, an allocation tool 142 and an actuation tool 143.

Using the information in the observed state model and the desired state model, the conformance tool 141 determines whether the service requirements are being satisfied and takes actions if the requirements are not satisfied. For example, the conformance tool 141 verifies whether higher-level policy statements for a service are being conformed to in the environment. This may include identifying policies in the desired state model and determining whether constraints in the policies are satisfied. If there are deviations, then appropriate actions are taken to make the two states consistent.

Figure 4:
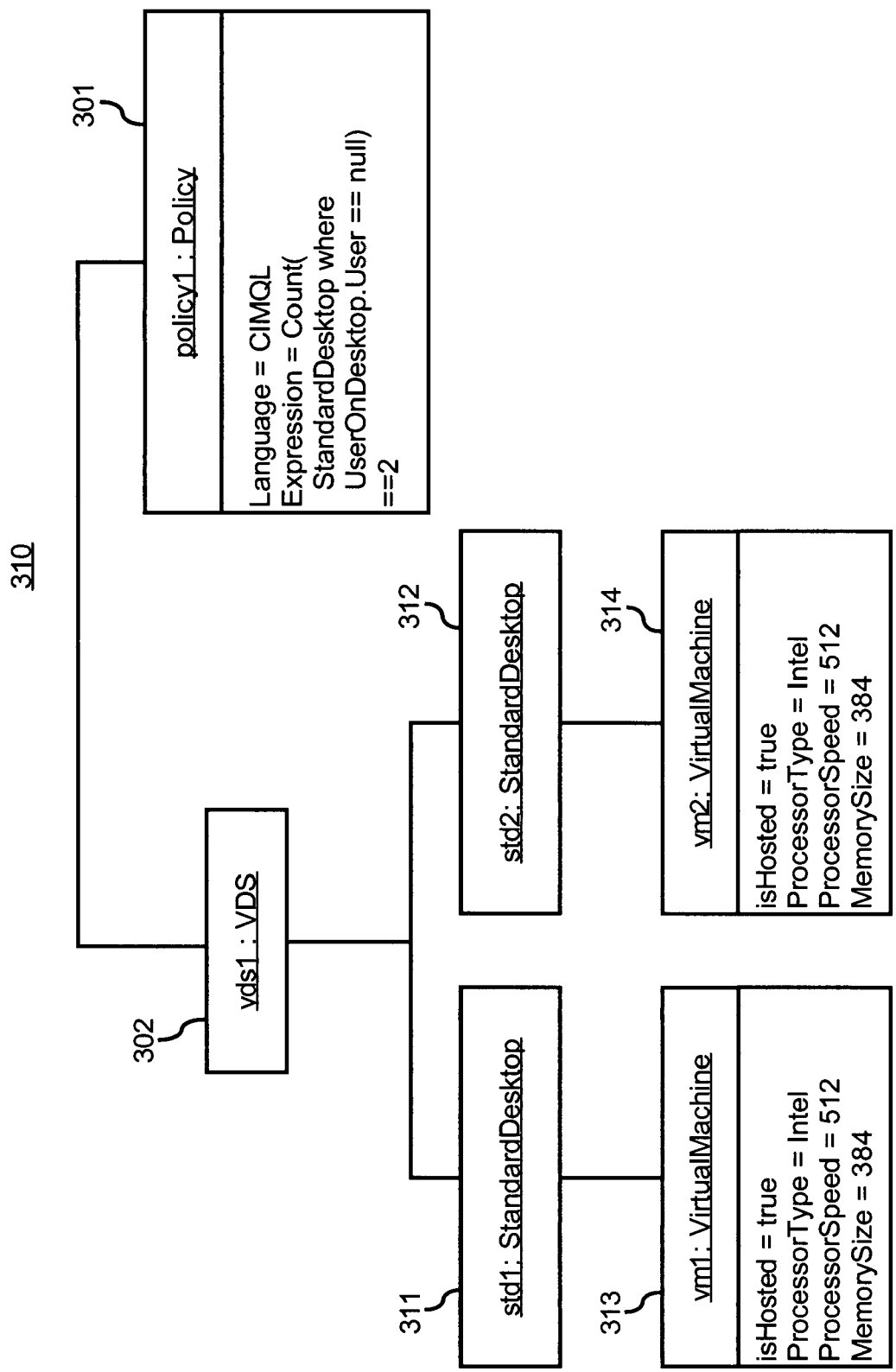
FIG. 4 illustrates a desired state model modified by a conformance tool, according to an embodiment.

To illustrate actions performed by the conformance tool 141, FIGS. 2 and 3 show the initial desired state model of the VDS, and FIG. 4 shows the revised desired state model 310, which is revised by the conformance tool 141 to conform the desired state with the observed state. As described above and shown in FIG. 3, the policy object 301 includes an instance of the Policy class 207 shown in FIG. 1. The policy requires two standard desktops deployed in the VDS on which no user is logged in, as indicated by the null value for the association UserOnDesktop. For example, these desktops form a pool of desktops that may be quickly deployed to users if needed.

Assume the conformance tool 141 executes and determines that the observed state model reflects that all deployed standard desktops are in use. Thus, the desired state model is not satisfied, because two standard desktops deployed in the VDS on which no user is logged in are not deployed. In other words, the policy applicable to the VDS class is not satisfied. As a result of executing the conformance tool 141, the desired state model 200 is refined to the desired state model 310 shown in FIG. 4 so the policy can be satisfied.

The new desired state model 310 shown in FIG. 4 shows two new standard desktop instances, std1 and std2 shown as 311 and 312, which have been added to the desired state model 300. These instances are added to conform to the policy object 301 which states that there should be two standard desktops with no user associated. Each of these standard desktop instances 311 and 312 is additionally associated with a new virtual machine instance 313 and 314 respectively. These instances are created as a result of a policy on the standard desktop. This policy asserts that any standard desktop should be associated with one virtual machine, and that the virtual machine should have the property values, such as ProcessorType=Intel. The policy constraints are shown in 313 and 314.

Figure 5:
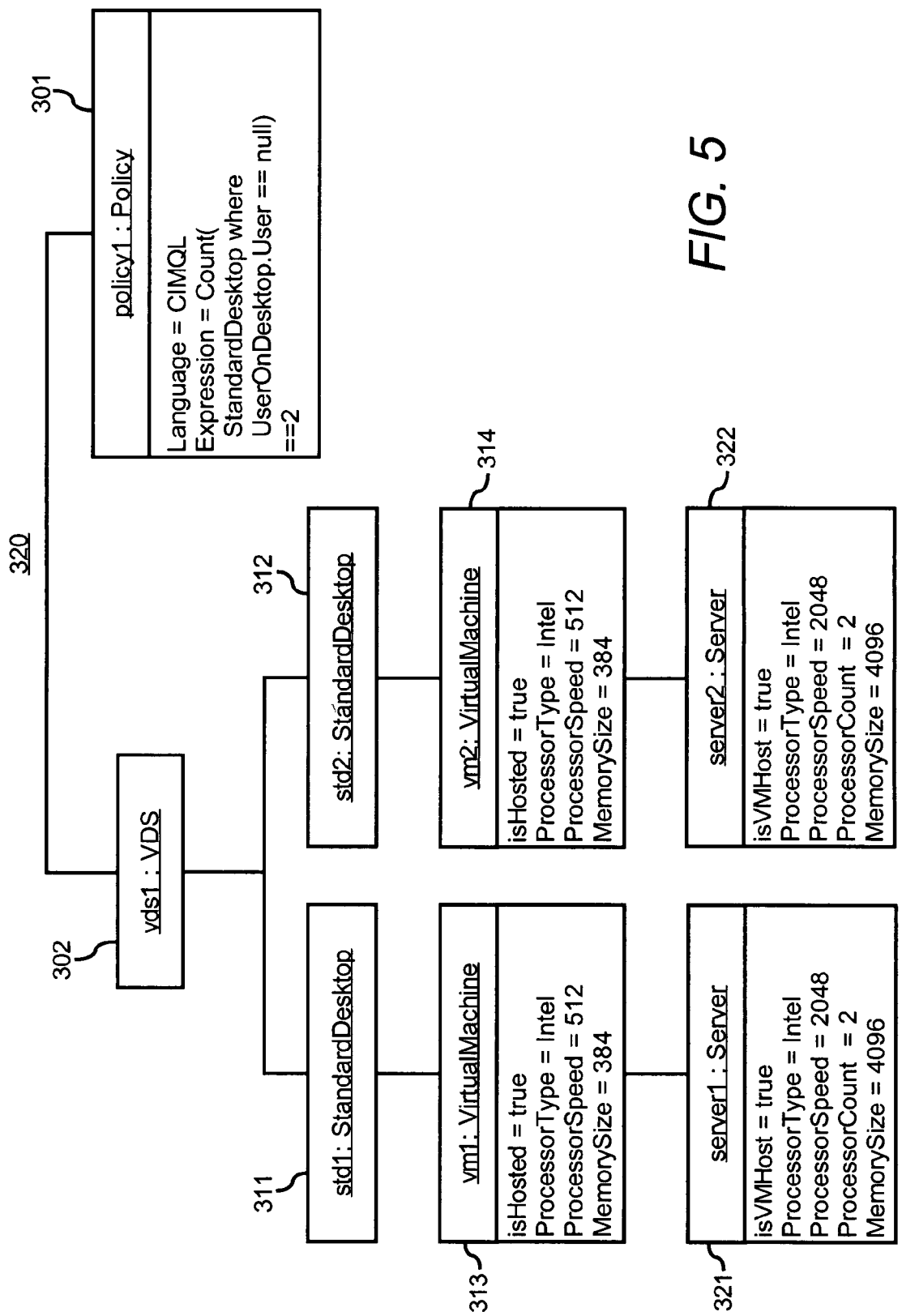
FIG. 5 illustrates a desired state model modified by an allocation tool, according to an embodiment.

The allocation tool 142 matches entities that consume capacity, such as desktop users of the VDS with other entities which provide capacity, such as resources in the pool of resources 110. During provisioning, this matching may be performed one or more times for different definitions of users and resources. As an example, refer to the desired state model 200 shown in FIG. 2. The VirtualMachine class 203 is a typical example of a class for virtual machines, and shows the relationship between a virtual machine and a server capable of hosting the virtual machine. When a virtual machine is placed on a server that relationship is shown as an association called HostedOn. If the refined desired state model 310 from FIG. 4 is provided as input to the allocation tool 142, the output may be the revised desired state model 320 shown in FIG. 5.

The allocation tool 142 refined the desired state model by first adding Server instances 321 and 322. The Server instances 321 and 322 are guaranteed to have sufficient capacity to host the virtual machines 313 and 314. The allocation tool 142 compares its input desired state model with the current observed state model. Wherever there are users that need resources, the allocation tool 142 finds those resources. Wherever there are users that are no longer present in the desired state model, the allocation tool 142 de-allocate those resources and uses them for other needs.

Functions for solving the allocation problem have been very well studied, and can vary from simple bin-packing to more complex heuristics incorporating techniques such as linear programming and genetic algorithms. These functions are generic enough that they can be used to map an arbitrary set of users, such as a set of desktops to be deployed, to an arbitrary set of resource providers, such as a set of virtual machines. To match resources with demand, the functions may only need to know what to look for in the information models to determine which objects are users and which objects are resource providers. According to an embodiment, this is done by customizing the allocation tool 142 through an "allocation descriptor". Allocation descriptors 154 may be provided as part of the user input 160 and may be stored in the data storage 150. An allocation descriptor may be in the form of a CIM model. This model identifies the model entities corresponding to users and resources, the conditions under which they can be matched, and how that match is represented in the modeled environment.

FIG. 6 shows an example of an allocation descriptor model 600 corresponding to the classes in the model 200 shown in FIG. 2. The allocation descriptor model 600 specifies the model definitions for the users and resources which the allocation tool 1421 performs matching on. In this example, the user, also referred to as consumer, is an instance of the VirtualMachine class 203, and the resource is an instance of the Server class 204. This is shown as ConsumerClass 601 and ResourceClass 602. In addition to the class definitions, such as ConsumerClass 601 and ResourceClass 602 definitions, the model 600 may define filters which must be satisfied by the instances for them to be considered by the allocation tool 142 as entities requiring allocation in the case of users or capable of providing capacity in the case of resources. In the model 600, ConsumerFilter 603 and ResourceFilter 604 are shown. The ConsumerFilter 603 specifies that a VirtualMachine entity only requires allocation if its "is Hosted" property is false. Thus, a virtual machine is only allocated if it is hosted by a server in this example. ResourceFilter 604 specifies that a Server entity is only capable of hosting a virtual machine if its "is VMHost" property is true. By providing these filters, the number of (consumer, resource) pairs that the allocation tool 142 must consider is limited, which helps to reduce the time required during allocation.

Even after filtering, it may be necessary to compare attributes of the consumer and resource to insure that they are a compatible match. This is performed via constraint expressions. These are Boolean expressions which must be true if a match is to be performed. Attributes of the resource are specified using the "resource" pre-fix and attributes of the consumer are similarly specified using the "consumer" pre-fix, such as shown for the ConstrExpr 605. ConstrExpr 605 states that the processor type of the virtual machine and the server must have the same value.

In addition to satisfying the defined constraints, a consumer can only be matched with a resource if the resource has sufficient capacity. For this, the capacity provided by the resource and the capacity used by a consumer in terms of the attributes on the model definition kr these classes are defined. These values are given in an attribute map. The attribute map defines expressions corresponding to the amount of capacity the resources provide, such as the ResourceCapExpr 606, and the amount of capacity a consumer utilizes, such as the ConsumerCapExpr 607. The model 600 shows an attribute map for memory utilization. Note that the resource's capacity is reduced by a constant value, 512, which represents reserved capacity for the server which hosts the virtual machines.

The allocation description model may also specify how matches are written back into the model repository. As shown, this is accomplished using an association. For example, the definition of the association is given with the descriptor properties AssociationClass, ResourceAssociationProp and ConsumerAssociationProp, shown in 608-610. These specify for the allocation tool 142 what association type to create, and what the properties on that association are for the resource and consumer respectively. By creating this association, the allocation tool 142 is able to indicate, to further steps in the provisioning process, exactly what matches have been performed, and what therefore may need to be enacted to satisfy the desired state.

The actuation tool 143 performs actions for putting decisions made earlier in the provisioning process, for example by the conformance and allocation tools 141 and 142, into effect in the system 100. Because all of the decisions have been made and the configuration is stored, for example as a desired state model and an observed state model, actuation is simplified to be only the step of changing specific components in the pool of resources 110. Typically, this involves the creation of virtual machines and the configuration of physical devices to host the virtual machines or provide other resources for the VDS. Conventional tools which have been designed for managing infrastructure components may be used. Examples of these tools include the Virtual Machine Management (VMM) and Rapid Deployment Pack (RDP) products.

The system 100 shown in FIG. 1 includes a resource manager 120. The resource manager 120 includes a resource monitor 124. The resource monitor 124 may be operable to identify attributes of allocated and available resources in the pool of resources 110 and may also measure utilizations. The attributes and measurements may be used to populate observed state models.

The flexibility of the provisioning system 130 results from two properties. First, the management tools 140 support a uniform abstraction, and thus can be composed into a workflow without the need to write any code. Second, the inputs to such a workflow and the tools from which it is comprised are models. These models allow behavior of the workflow to be easily defined. The workflow may include the order of actions performed by each management tool to provision resources for a shared service. To illustrate these two properties, the running example of provisioning resources for a VDS is used For example, the system operator wishes to deploy a second type of desktop that, like the standard desktop, runs within a virtual machine. This new desktop type is called premium and offers twice the computing power, e.g., twice the CPU speed, of the standard desktop and must be hosted by a different set of servers. Also, the system operator wishes to deploy a third type of desktop, called platinum. The platinum desktop, unlike the other two types of desktops, does not run within a virtual machine. Rather, it runs directly on top of a physical server. That is, the platinum desktop does not require a virtualization layer.

To support the first case, the system operator need only redefine the inputs to the provisioning workflow that were described above. To do this, the operator performs just two steps. First, the operator augments the existing desired state model shown in FIG. 2 with a new class representing the premium desktop. This class has the same associations as the standard desktop class. Second, the operator defines a new instance of the policy class shown in FIG. 3 for the premium desktop and captures within it the desired state for this new desktop type. For example, the operator may specify that there should be 4 premium desktops always available for users to login. These steps are all that are necessary to introduce the new type of desktop. The management tools 140 read these models, and maintain the pool of desired premium desktops just as they do for the standard desktops.

Figure 7:
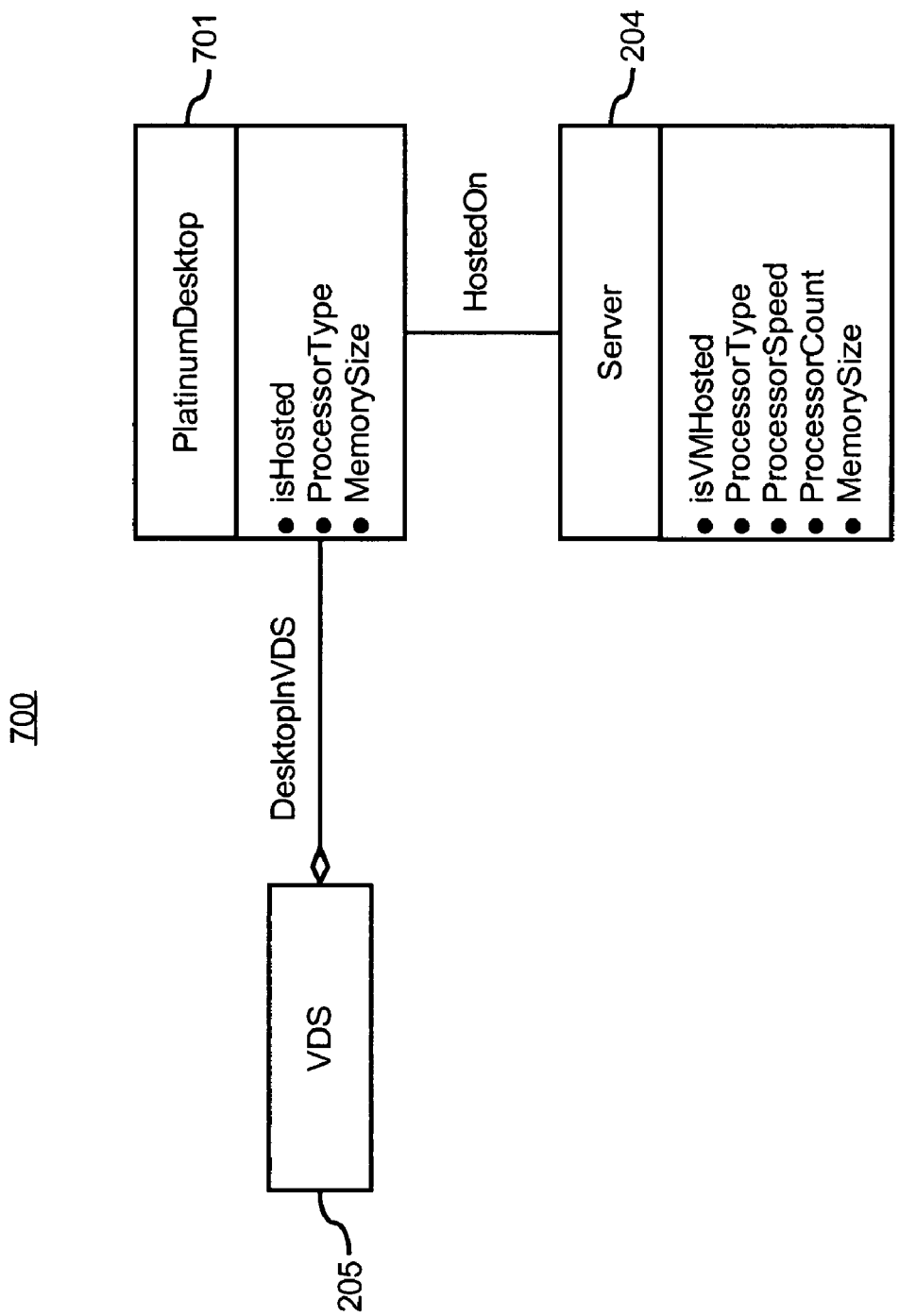
FIG. 7 illustrates a new class added to a desired state model, according to an embodiment.

To support the second case in which the third type of desktop is run directly on top of the physical server, the operator perform similar steps but also changes the provisioning workflow. First, like with the premium desktop, the operator modifies the desired state model to include another desktop class called platinum. However, the operator creates an association between this class to the physical server without the virtual machine in the middle. FIG. 7 shows a new PlatinumDesktop class 701. The PlatinumDesktop class 701 is associated with the Sever class 204 and the VDS class 205. Note that a platinum desktop is hosted on an instance of the Server class 205, and the platinum desktop is in the VDS class 205. Second, the operator may define a desired state policy for the platinum class, which may specify the number of idle desktops that exist in the computing environment. Third, the operator creates a new allocation descriptor that specifies platinum desktops should be allocated to physical servers not virtual machines. Finally, the operator integrates into the workflow a tool that can boot an operating system on a system, such as RDP. This tool is used whenever a platinum desktop is provisioned. When a premium or standard desktop is provisioned, a different tool is, such as a virtual machine management tool.

Figure 8:
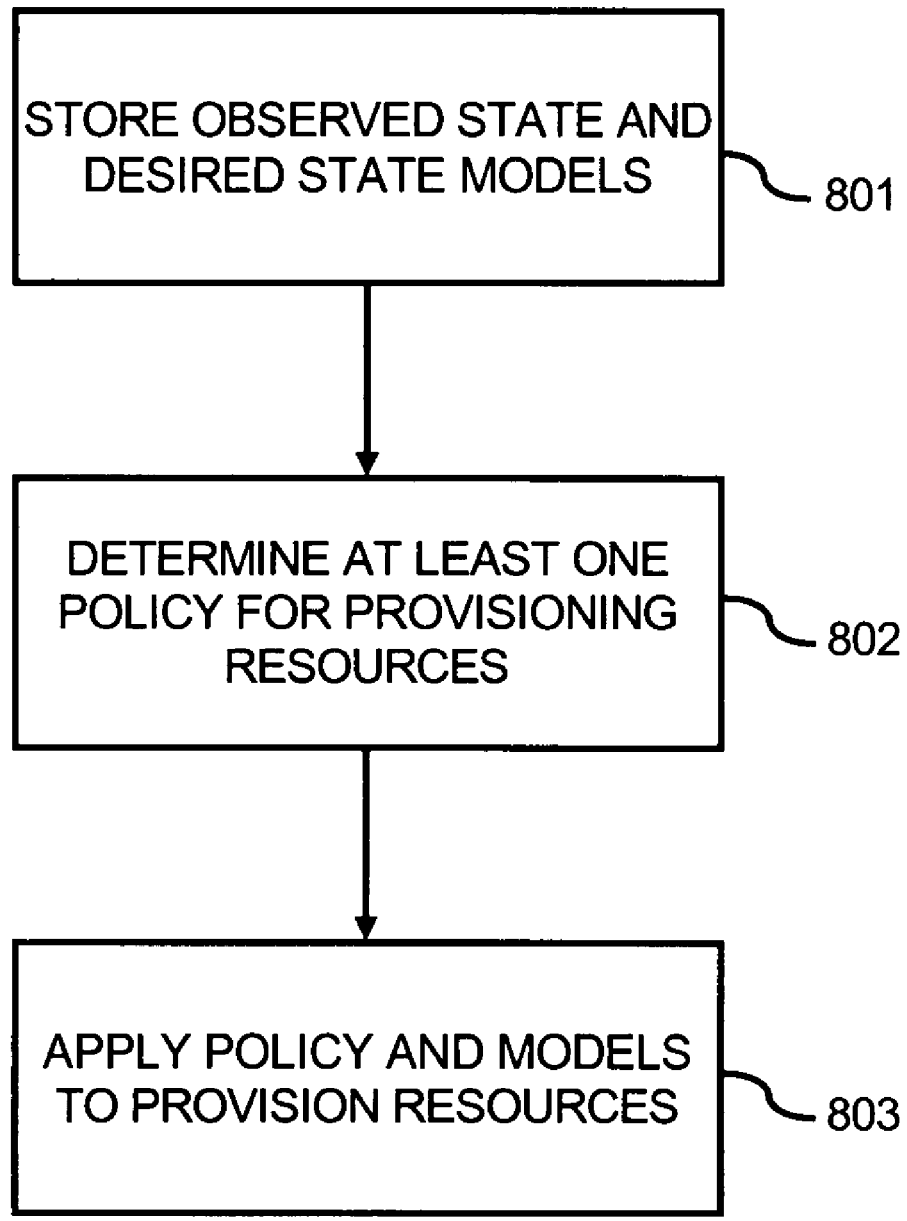
FIG. 8 illustrates a flow chart of a method for provisioning resources, according to an embodiment.

FIG. 8 illustrates a flow chart of a method 800 for provisioning resources for a shared services in a resource-on-demand system. The method 800 is described with respect to FIGS. 1-7 by way of example and not limitation. The method 800 may be performed in other systems and may be used to provision resources for a service other than a VDS.

At step 801, models representing an observed state of resources allocated to the shared services and representing a desired state of the shared services are stored. For example, observed state models 151 and desired state models 152, shown in FIG. 1, may include an observed state model and a desired state model for a VDS.

At step 802, at least one policy applicable to provisioning resources for the shared services is determined. This may include identifying a policy specified in the desired state model for VDS. FIG. 2 shows a policy class 207 for the desired state model 200, and FIG. 3 shows an instance of the policy that is identified by the conformance tool 141 for provisioning resources. Policies may also be provided as constraints in allocation descriptors, and these policies must be satisfied when allocating resources.

At step 803, the policies and information from the models are applied to automatically provision resources to satisfy the desired state of the shared service. This may include one or more of identifying that there is a non-conformance between the desired state model and the observed state model, and modifying the desired state model and/or allocating resources to satisfy user demand. Provisioning may also include automatically allocating the resources to satisfy the user demand, such as described with respect to the allocation tool 142 and the actuation tool 143 shown in FIG. 1.

Figure 9:
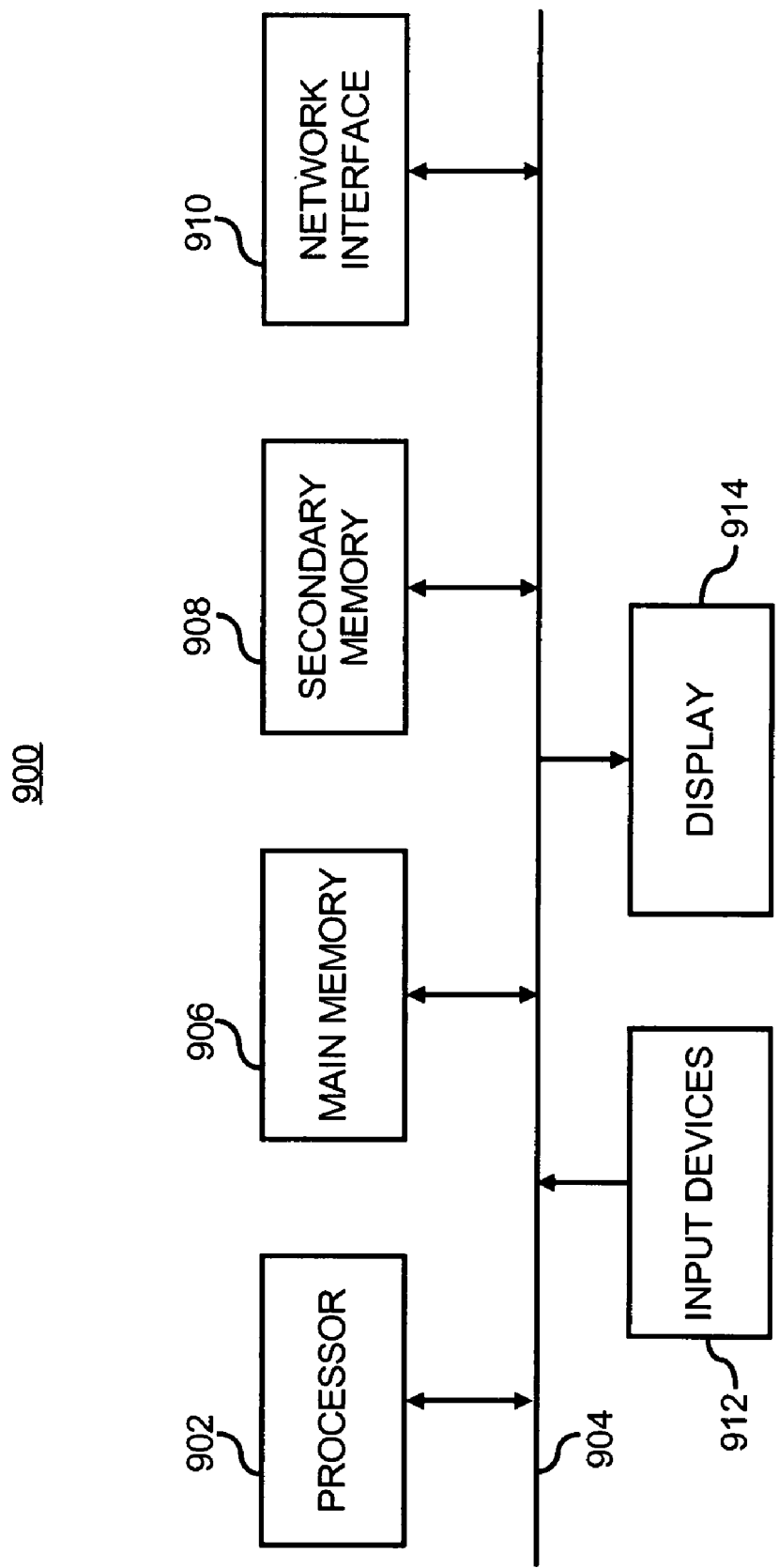
FIG. 9 illustrates a computer system, according to an embodiment.

FIG. 9 shows a schematic block diagram of a computer system 900, according to an embodiment. The computer system 900 may be used as a platform for the provisioning system 130 shown in FIG. 1.

The computer system 900 includes one or more processors, such as processor 902, providing an execution platform for executing software. Commands and data from the processor 902 are communicated over a communication bus 904. The computer system 900 also includes a main memory 906, such as a random access memory (RAM), where software may be resident during runtime, and a secondary memory 908. The secondary memory 908 includes, for example, a hard disk drive or other type of storage device. Other examples of the secondary memory 908 include ROM (read only memory), EPROM (erasable, programmable ROM), EEPROM (electrically erasable, programmable ROM).

The computer system 900 optionally includes user interfaces comprising one or more input devices 912, such as a keyboard, a mouse, a stylus, and the like. The computer system 900 also optionally includes a display 914. A network interface 910 is provided for communicating with other computer systems. It will be apparent to one of ordinary skill in the art that the computer system 900 may include more or less features depending on the complexity of the system needed.

It will be apparent to one of ordinary skill in the art that FIG. 9 is meant to illustrate a generic computer system. Any type of computer system may be used. Furthermore, one or more components of the components of the computer system 900 are optional, such as the display and input devices, and other types of components may be used or substituted as is known in the art.

One or more of the steps of the method 800 and other steps described herein may be implemented as software embedded or stored on a computer readable medium, such as the memory 906, and executed by the processor 902. The steps may be embodied by a computer program, which may exist in a variety of forms both active and inactive. For example, there may exist as software program(s) comprised of program instructions in source code, object code, executable code or other formats for performing some of the steps when executed, for example, by the processor 902. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. It is therefore to be understood that those functions enumerated herein may be performed by any electronic device capable of executing the above-described functions.

What is claimed is:

1. A method of provisioning resources for shared services in a resource-on-demand system, the method comprising:

storing a model representing an observed state of resources in the resource-on-demand system allocated to the shared services and a model representing a desired state of the shared services including shared services resource requirements;

populating the model representing the observed state based on observations from a monitoring tool monitoring the resources;

determining, using a processor, at least one policy applicable to provisioning the resources for the shared services; and applying the at least one determined policy and information from the models to automatically provision the resources to satisfy the desired state of the shared services, wherein the applying includes:

comparing the observations from the monitoring tool from the model representing the observed state with the shared services resource requirements from the model representing the desired state of the shared services;

determining from the comparison that there is a difference between the observations and the shared services resource requirements; and adjusting, based on having determined the difference, at least one of the desired state in the model representing the desired state of the shared services and the allocation of resources for the shared services.

2. The method of claim 1, further comprising:
receiving a revised model representing a desired state including new or modified service elements for the shared services, wherein the revised model representing a desired state represents changes to the shared services prescribed by a service operator; and
automatically provisioning resources to satisfy the new or modified desired service elements.

3. The method of claim 2, wherein the shared services comprises a virtual desktop system, and the revised model representing a desired state includes one or more new desktop classes.

4. The method of claim 1, further comprising:
performing a sequence of actions in a workflow for provisioning resources to achieve the desired state of the shared services from the observed state of the shared services, wherein the desired state is determined from the model representing a desired state and the observed state is determined from the model representing an observed state.

5. The method of claim 1, wherein determining at least one policy applicable to provisioning the resources for the shared services comprises:
identifying the at least one policy from the model representing a desired state.

6. The method of claim 5, wherein the model representing the observed state is a hierarchal model where different levels of the hierarchy represent different types of resources to be allocated to the shared services, and applying the at least one determined policy and information from the models to automatically provision the resources to satisfy the desired state of the shared services comprises:
for each of the policies, identifying the level of the hierarchy that the policy is applicable; and
applying the policy to the resources associated with the identified level of the hierarchy when allocating the resources for the shared services.

7. The method of claim 6, wherein applying the policy to the resources associated with the identified level of the hierarchy when allocating the resources for the shared services comprises:
applying the policy to the resources associated with the identified level of the hierarchy and resources associated with levels lower than the identified level.

8. The method of claim 1, wherein determining at least one policy applicable to provisioning the resources for the shared services comprises:
identifying the at least one stored policy from an allocation description specifying at least one constraint on allocating the resources for the shared services.

9. The method of claim 7, further comprising:
allocating the resources for the shared services such that the policies are satisfied.

10. The method of claim 1, wherein the models are information models comprised of structured information for managing the resources including systems and applications operable to be allocated to the shared services.

11. The method of claim 1, wherein the model representing a desired state comprises a description of the shared services and goals for provisioning the shared services.

12. The method of claim 11, further comprising:
receiving the description of the shared services and the goals for provisioning the shared services from a user.

13. A model-based provisioning system operable to allocate resources in a resource-on-demand system to shared services, the provisioning system comprising:
data storage storing a model representing an observed state of resources in the resource-on-demand system allocated to the shared services and a model representing a desired state of the shared services including shared services resource requirements; and
management tools determining at least one policy applicable to provisioning resources in the resource-on-demand system for the shared services, and applying the at least one determined policy and information from the models to automatically provision resources in the resource-on-demand system to satisfy the desired state of the shared services,
wherein the management tools
populate the model representing the observed state based on observations from a monitoring tool monitoring the resources,
compare the observations from the monitoring tool from the model representing the observed state with the shared services resource requirements from the model representing the desired state of the shared services,
determine from the comparison that there is a difference between the observations and the shared services resource requirements, and
adjust, based on having determined the difference, at least one of the desired state in the model representing the desired state of the shared services and the allocation of resources for the shared services if there is a difference.

14. The provisioning system of claim 13, wherein the management tools perform a sequence of actions in a workflow for provisioning resources to achieve the desired state of the shared services from the observed state of the shared services, wherein the desired state is determined from the model representing a desired state and the observed state is determined from the model representing an observed state.

15. The provisioning system of claim 13, wherein the management tools satisfy constraints by using at least one policy when provisioning the resources for the shared services.

16. The provisioning system of claim 13, wherein the model representing the observed state is a hierarchal model where different levels of the hierarchy represent different resources to be allocated to the shared services, and for each of the policies, the management tools identify the level of the hierarchy that the policy is applicable, and apply the policy to the provisioning of resources associated with the identified level of the hierarchy and associated with any levels below the identified level as needed to satisfy the policy.

17. A non-transitory computer readable medium upon which is embedded programmed instructions which when executed by a processor will cause the processor to perform a method for provisioning resources for shared services in a resource-on-demand system, the method comprising:
storing a model representing an observed state of resources in the resource-on-demand system allocated to the shared services and a model representing a desired state of the shared services including shared services resource requirements;

populating the model representing the observed state based on observations from a monitoring tool monitoring the resources;

determining at least one policy applicable to provisioning the resources for the shared services; and applying the at least one determined policy and information from the models to automatically provision the resources to satisfy the desired state of the shared services, wherein the applying includes:

comparing the observations from the monitoring tool from the model representing the observed state with the shared services resource requirements from the model representing the desired state of the shared services;

determining from the comparison that there is a difference between the observations and the shared services resource requirements; and adjusting, based on having determined the difference, at least one of the desired state in the model representing the desired state of the shared services and the allocation of resources for the shared services.

18. The computer readable medium of claim 17, wherein the method comprises performing a sequence of actions in a workflow for provisioning resources to achieve the desired state of the shared services from the observed state of the shared services, wherein the desired state is determined from the model representing a desired state and the observed state is determined from the model representing the observed state.

* * * * *